United States Patent
Yamaguchi et al.

(10) Patent No.: US 7,373,064 B2
(45) Date of Patent: May 13, 2008

(54) POLYMERIC OPTICAL WAVEGUIDE FILM

(75) Inventors: Masatoshi Yamaguchi, Tsukuba (JP); Tooru Takahashi, Tsukuba (JP); Shigeru Koibuchi, Tsukuba (JP); Nobuo Miyadera, Tsukuba (JP)

(73) Assignee: Hitachi Chemical Co., Ltd., Tokyo (JP)

( * ) Notice: Subject to any disclaimer, the term of this patent is extended or adjusted under 35 U.S.C. 154(b) by 0 days.

(21) Appl. No.: 11/468,612

(22) Filed: Aug. 30, 2006

(65) Prior Publication Data

US 2006/0291790 A1 Dec. 28, 2006

Related U.S. Application Data

(60) Division of application No. 10/876,713, filed on Jun. 28, 2004, now Pat. No. 7,162,134, which is a continuation of application No. PCT/JP02/13667, filed on Dec. 26, 2002.

(30) Foreign Application Priority Data

Dec. 28, 2001 (JP) .............................. 2001-399451

(51) Int. Cl.
*G02B 6/10* (2006.01)
(52) U.S. Cl. ..................................... 385/129
(58) Field of Classification Search .................... None
See application file for complete search history.

(56) References Cited

U.S. PATENT DOCUMENTS

| | | | | |
|---|---|---|---|---|
| 5,649,045 | A * | 7/1997 | Fjare et al. .................. | 385/145 |
| 6,091,874 | A * | 7/2000 | Higashi et al. .............. | 385/130 |
| 6,473,551 | B2 * | 10/2002 | Norwood et al. ........... | 385/130 |
| 6,549,709 | B1 * | 4/2003 | De Dobbelaere et al. ..... | 385/49 |
| 6,671,438 | B2 * | 12/2003 | Ido et al. ....................... | 385/49 |
| 2006/0008225 | A1 * | 1/2006 | Naitou et al. ................ | 385/129 |

FOREIGN PATENT DOCUMENTS

| | | |
|---|---|---|
| JP | 3147284 | 11/1996 |
| JP | 9-251113 | 9/1997 |
| JP | 11-38241 A2 | 2/1999 |
| JP | 2001-74949 A | 3/2001 |
| JP | 2001-74952 A | 3/2001 |
| JP | 2001-166166 | 6/2001 |
| JP | 2002-22988 A | 1/2002 |
| JP | 2002-22993 A | 1/2002 |
| JP | 2002-71989 A | 3/2003 |

OTHER PUBLICATIONS

International Search Report Issued in the Corresponding PCT/JP02/13667, Completed Feb. 17, 2003 and Mailed on Mar. 4, 2003.
Japanese Office Action corresponding to JP 2003-558560, dated Jun. 26, 2006.
Office Action Jun. 26, 2006 and issued in corresponding PCT/JP2002/13667, filed Dec. 26, 2002.

* cited by examiner

*Primary Examiner*—Sung Pak
(74) *Attorney, Agent, or Firm*—Griffin & Szipl, P.C.

(57) ABSTRACT

The present invention provides a polymeric optical waveguide film whose core and clad are constituted from polymer materials and which is characterized in that a protective layer of a polymer material having resistance to solvent attack higher than that observed for the clad is arranged on at least one of the surface and back face of the waveguide film. The present invention thus permits the preparation of such a film, the clad of which is hardly damaged, which is excellent in the resistance to solvent attack and which never undergoes cracking even when it is bought into contact with a commonly used solvent such as acetone.

12 Claims, 1 Drawing Sheet

POLYMERIC OPTICAL WAVEGUIDE FILM

This is a divisional application of U.S. patent application Ser. No. 10/876,713, filed Jun. 28, 2004, now U.S. Pat. No. 7,162,134, which is a continuation application of International Patent Application No. PCT/JP02/13667, filed Dec. 26, 2002, which claims priority on Japanese Patent Application No. 2001-399451, filed Dec. 28, 2001. The entire disclosures of the above patent applications are hereby incorporated by reference.

TECHNICAL FIELD

The present invention relates to a polymeric optical waveguide film prepared from a fluorine atom-containing polyimide resin as well as a method for the preparation of the same.

BACKGROUND ART

There has rapidly been increased requirements for the development of a large capacity-information transmission along with the recent wide spread of personal computers and the internet. For this reason, it has been desired for the spread of the optical transmission, which can ensure a high transmission rate, even to the terminal information transmission devices such as personal computers. To realize this, it is necessary to mass-produce, at a low production cost, a small-sized optical transmission-reception module whose optical transmission and reception functions are united using a high quality optical waveguide or the like, for use in the optical interconnection.

As materials for preparing such an optical waveguide, there have been known, for instance, inorganic materials such as glass and semiconductor materials and various resins. When it is intended to prepare an optical waveguide using a resin, film-forming processes required can be conducted by coating and heating operations under the atmospheric pressure and accordingly, this method is quite advantageous in that devices and processes to be used are quite simple. Various kinds of resins have been known as those which permit the constitution of an optical waveguide and a clad layer and, in particular, polyimides have been expected as such materials because of their high glass transition points (Tg) and excellent heat resistance. When preparing the core and clad of such an optical waveguide using a polyamide resin, the resulting waveguide may ensure long-term reliability and it can withstand the soldering.

The conventional optical waveguide comprising such a core and a clad is formed on a thick substrate made of, for instance, an inorganic material such as glass or silicon or an organic material such as an acrylic resin and therefore, it is inferior in its flexibility. For this reason, it has been difficult to apply such a conventional optical waveguide to optical wire distribution and/or branching having good flexibility.

Thus, there have been prepared a polymeric optical waveguide film having flexibility, which simply comprises a core and a clad, both of which are made of polymer materials.

Such a flexible polymeric optical waveguide film has conventionally been prepared by applying a clad onto a thick substrate made of, for instance, an inorganic material such as glass or silicon or an organic material such as an acrylic resin; forming a core on the clad; applying a clad in such a manner that the core is completely covered with the same to thus form a polymeric optical waveguide film; and then removing the resulting waveguide film from the substrate.

However, if the adhesion between the substrate and the film is too weak, the film is often removed from the substrate during the course of the preparation thereof, while if the adhesion between them is too strong, the resulting film cannot easily be removed from the substrate. For this reason, there has been desired for the development of a method which can ensure a strong adhesive force between a substrate and a polymeric optical waveguide film during the course of the preparation thereof and which permits easy removal of the resulting film from the substrate. However, there has not conventionally been known any method which can satisfy the foregoing requirements.

As has been discussed above, the use of a fluorine atom-containing polyimide type resin would permit the preparation of an optical device excellent in optical characteristics as compared with those observed for an optical device obtained using an inorganic substance such as a glass material, while using simple processes. However, this method suffers from such a problem that defects are formed on the surface of the clad layer during the process for the production of the optical waveguide film and that the fluorine atom-containing polyimide resin film is sometimes peeled off from the substrate during producing the film due to a low adhesive force between the film and the substrate. Moreover, the fluorine atom-containing polyimide type resin shows insufficient resistance to solvent attack and therefore, problems arise, such that the method is considerably limited in solvents, which can be used in the step for washing the resulting film and that when using a commonly used solvent such as acetone, cracks are formed.

DISCLOSURE OF THE INVENTION

Accordingly, it is an object of the present invention to provide a polymeric optical waveguide film, the clad of which is hardly damaged, which is excellent in the resistance to solvent attack and which never undergoes cracking even when it is bought into contact with a commonly used solvent such as acetone.

It is another object of the present invention to provide a method for the preparation of a polymeric optical waveguide film, which is never accompanied by the formation of any defect on the surface of the clad and the removal of the film from the substrate during the waveguide film-production step and which is never accompanied by the formation of any crack even when using a commonly used solvent such as acetone.

According to an aspect of the present invention, there is provided a polymeric optical waveguide film in which the core and clad thereof are constituted from polymer materials and which is characterized in that a protective layer of a polymer material having resistance to solvent attack higher than that observed for the clad is arranged on at least one of the surface and back face of the waveguide film.

According to a preferred embodiment of the present invention, there is provided a polymeric optical waveguide film in which the elastic modulus of the film ranges from 2 to 9 GPa.

According to another aspect of the present invention, there is provided a method for the preparation of a polymeric optical waveguide film having protective films on the both side, which comprises, in order, the steps of forming a protective layer of a polymer material having resistance to solvent attack higher than that observed for the following clad layer on a silicon substrate provided thereon with a silicon oxide film, forming a lower clad layer, forming a core layer on the lower clad layer, forming an upper clad layer so as to completely cover the core layer and then forming a protective layer of a polymer material having resistance to solvent attack higher than that observed for the upper clad layer on the latter, to thus form a polymeric optical waveguide film on the silicon substrate; and thereafter immersing the resulting assembly in water to peel the optical waveguide film off from the silicon substrate.

According to a further aspect of the present invention, there is provided a method for the preparation of a polymeric optical waveguide film having a protective film on one side thereof, which comprises, in order, the steps of forming a protective layer of a polymer material having resistance to solvent attack higher than that observed for the following clad layer on a silicon substrate provided thereon with a silicon oxide film, forming a lower clad layer, forming a core layer on the lower clad layer and forming an upper clad layer so as to completely cover the core layer to thus form a polymeric optical waveguide film on the silicon substrate; and thereafter immersing the resulting assembly in water to peel the optical waveguide film off from the silicon substrate.

BEST MODE FOR CARRYING OUT THE INVENTION

Figure 1:
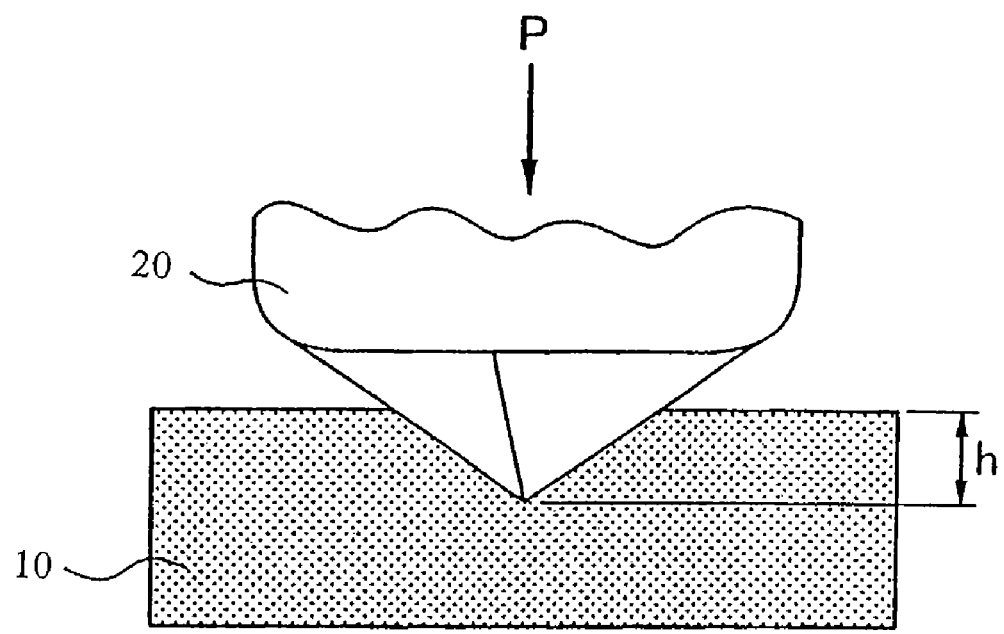
FIG. 1 is a diagram for illustrating the principle of measuring the elastic modulus of the polymeric optical waveguide film according to the present invention.

In the present invention, the term "polymeric optical waveguide film" used means a plate-like optical waveguide film having a core-clad structure, completely free of any substrate or a member corresponding thereto unlike the conventional optical waveguide comprising a substrate as well, substantially comprising polymer materials alone and having good flexibility.

The polymeric optical waveguide film of the present invention is characterized in that it has a protective layer excellent in resistance to solvent attack on at least one side of the waveguide film.

The polymeric optical waveguide film having solvent-resistant protective films on the both sides thereof according to the present invention is prepared by, for instance, a method which comprises, in order, the steps of forming a protective layer (the thickness thereof preferably ranging from 0.5 to 20 μm and more preferably 0.5 to 10 μm) of a polymer material having resistance to solvent attack higher than that observed for the following clad layer on a silicon substrate provided thereon with a silicon oxide ($SiO_2$) film (the thickness thereof preferably falling within the range of from 0.5 to 10 μm), forming a lower clad layer (the thickness thereof ranging preferably from 5 to 30 μm), forming a core layer (the thickness thereof preferably ranging from 4 to 50 μm and more preferably 4 to 15 μm) on the lower clad layer, forming an upper clad layer (the thickness thereof ranging preferably from 5 to 30 μm) so as to completely cover the core layer and then forming a protective layer (the thickness thereof preferably ranging from 0.5 to 20 μm and more preferably 0.5 to 10 μm) of a polymer material having resistance to solvent attack higher than that observed for the upper clad layer on the latter, to thus form a polymeric optical waveguide film (the thickness thereof preferably ranging from 20 to 150 μm and more preferably 20 to 70 μm) on the silicon substrate; and thereafter immersing the resulting assembly in water to peel the optical waveguide film off from the silicon substrate.

Moreover, the polymeric optical waveguide film having a solvent-resistant protective film on one side thereof according to the present invention is prepared by, for instance, a method which comprises, in order, the steps of forming a protective layer (the thickness thereof preferably ranging from 0.5 to 20 μm and more preferably 0.5 to 10 μm) of a polymer material having resistance to solvent attack higher than that observed for the following clad layer on a silicon substrate provided thereon with a silicon oxide film (the thickness thereof preferably falling within the range of from 0.5 to 10 μm), forming a lower clad layer (the thickness thereof ranging preferably from 5 to 30 μm), forming a core layer (the thickness thereof preferably ranging from 4 to 50 μm and more preferably 4 to 15 μm) on the lower clad layer and then forming an upper clad layer (the thickness thereof ranging preferably from 5 to 30 μm) so as to completely cover the core layer, to thus form a polymeric optical waveguide film (the thickness thereof preferably ranging from 20 to 130 μm and more preferably 20 to 60 μm) on the silicon substrate; and thereafter immersing the resulting assembly in water to peel the optical waveguide film off from the silicon substrate.

The polymeric materials for constituting the core and clad layers of the polymeric optical waveguide film according to the present invention may, for instance, be polyimide type resins, in particular, fluorine atom-containing polyimide type resins, acrylic resins, epoxy resins, sol-gels, and silicon-modified polymers, with fluorine atom-containing polyimide type resins being preferred among others.

Such fluorine atom-containing polyimide type resins may be, for instance, fluorine atom-containing polyimide resins, fluorine atom-containing poly(imide-isoindolo-quinazolin-dione-imide) resins, fluorine atom-containing poly(ether-imide) resins and fluorine atom-containing poly(amide-imide) resins.

As the polymeric materials used for forming the solvent-resistant protective layer in the polymeric optical waveguide film according to the present invention, there may be listed, for instance, acrylic resins, epoxy resins and polyimide type resins free of any fluorine atom.

A solution of a precursor for the foregoing fluorine atom-containing polyimide type resin may be prepared through a reaction of a tetra-carboxylic acid dianhydride with a diamine carried out in a polar solvent such as N-methyl-2-pyrrolidone, N,N-dimethyl-acetamide, γ-butyrolactone or dimethyl sulfoxide. In this respect, fluorine atoms may be included in the both or either of these tetra-carboxylic acid dianhydride and diamine.

On the other hand, a solution of a precursor for the foregoing polyimide type resin free of any fluorine atom may be prepared through a reaction of a fluorine atom-free tetra-carboxylic acid dianhydride with a fluorine atom-free diamine carried out in a polar solvent such as N-methyl-2-pyrrolidone, N,N-dimethyl-acetamide, γ-butyro-lactone or dimethyl sulfoxide.

Specific examples of fluorine atom-containing acid dianhydrides include (tri-fluoromethyl)pyromellitic acid dianhydride, di-(trifluoro-methyl)pyromellitic acid dianhydride, di-(hepta-fluoropropyl)pyromellitic acid dianhydride, penta-fluoroethyl pyromellitic acid dianhydride, bis{3,5-di-(trifluoromethyl)phenoxy}pyromellitic acid dianhydride, 2,2-bis(3,4-dicarboxy-phenyl)hexa-fluoropropane dianhydride, 5,5'-bis(trifluoro-methyl)-3,3',4,4'-tetracarboxy-biphenyl dianhydride, 2,2',5,5'-tetrakis-(trifluoromethyl)-3,3', 4,4'-tetracarboxy-biphenyl dianhydride, 5,5'-bis (trifluoromethyl)-3,3',4,4'-tetra-carboxy-diphenyl ether dianhydride, 5,5'-bis(tri-fluoromethyl)-3,3',4,4'-tetra-carboxy-benzophenone dianhydride, bis{(trifluoromethyl)dicarboxy-phenoxy}benzene dianhydride, bis{(trifluoro-methyl)dicarboxy-phenoxy}(trifluoromethyl)benzene dianhydride, bis-(dicarboxy-phenoxy)(trifluoromethyl)benzene dianhydride, bis(di-carboxy-phenoxy)bis(trifluoromethyl)benzene dianhydride, bis(dicarboxy-phenoxy)tetrakis (trifluoro-methyl)benzene dianhydride, 2,2-bis{(4-(3,4-dicarboxy-phenoxy)phenyl)hexa-fluoropropane dianhydride, bis{(trifluoro-methyl)dicarboxy-phenoxy}biphenyl dianhydride, bis{(trifluoromethyl)-dicarboxy-phenoxy}bis(trifluoromethyl)biphenyl dianhydride, bis{(trifluo-romethyl)dicarboxy-phenoxy}diphenyl ether dianhydride and bis(dicarboxy-phenoxy)bis(trifluoromethyl)biphenyl dianhydride.

Specific examples of such fluorine atom-containing diamines are 4-(1H, 1H,11H-eicosa-fluoro-undecanoxy)-1,3-diaminobenzene, 4-(1H, 1H-perfluoro-1-butanoxy)-1,3-diamino-benzene, 4-(1H, 1H-perfluoro-1-heptanoxy)-1,3-diamino-benzene, 4-(1H, 1H-perfluoro-1-octanoxy)-1,3-diamino-benzene, 4-penta-fluorophenoxy-1,3-diamino-benzene, 4-(2,3,5,6-tetrafluoro-phenoxy)-1,3-diamino-benzene, 4-(4-fluorophenoxy)-1,3-diamino-benzene, 4-(1H,1H,2H,2H-perfluoro-1-hexanoxy)-1,3-diamino-benzene, 4-(1H,1H,2H,2H-perfluoro-1-dodecanoxy)-1,3-diamino-benzene, (2,5-)diamino-benzo-tri-fluoride, bis(trifluoro-methyl)phenylene-diamine, diamino-tetra-(trifluoro-methyl)benzene, diamino(pentafluoromethyl)-benzene, 2,5-diamino-(perfluoro-hexyl)benzene, 2,5-diamino-(perfluoro-butyl)benzene, 2,2'-bis(trifluoromethyl)-4,4'-diaminobiphenyl, 3,3'-bis-(trifluoromethyl)-4,4'-diaminobiphenyl, octafluoro-benzidine, 4,4'-diamino-diphenyl ether, 2,2-bis(p-aminophenyl)hexafluoro-propane, 1,3-bis-(aniline)hexafluoro-propane, 1,4-bis(aniline)octafluoro-propane, 1,5-bis-(aniline)decafluoro-propane, 1,7-bis(aniline)tetradeca-fluoro-propane, 2,2'-bis(trifluoromethyl)-4,4'-diamino-di-phenyl ether, 3,3'-bis(trifluoromethyl)-4,4'-diamino-diphenyl ether, 3,3',5,5'-tetrakis(tri-fluoromethyl)-4,4'-diamino-diphenyl ether, 3,3'-bis(trifluoromethyl)-4,4'-diamino-benzo-phenone, 4,4'-diamino-p-terphenyl, 1,4-bis(p-aminophenyl)benzene, p-bis(4-amino-2-trifluoromethyl-phenoxy)benzene, bis(amino-phenoxy)-bis(tri-fluoromethyl)benzene, bis(amino-phenoxy)-tetrakis(trifluoromethyl)-benzene, 2,2-bis{4-(4-amino-phenoxy)phenyl}hexafluoro-propane, 2,2-bis{4-(3-amino-phenoxy)phenyl}hexafluoro-propane, 2,2-bis{4-(2-amino-phenoxy)-phenyl}hexafluoro-propane, 2,2-bis{4-(4-amino-phenoxy)-3,5-dimethyl-phenyl}hexafluoro-propane, 2,2-bis{4-(4-amino-phenoxy)-3,5-di-(trifluoro-methyl) phenyl}hexafluoro-propane, 4,4'-bis(4-amino-2-trifluoromethyl-phenoxy)biphenyl, 4,4'-bis(4-amino-3-trifluoromethyl-phenoxy)biphenyl, 4,4'-bis(4-amino-2-trifluoromethyl-phenoxy)diphenyl sulfone, 4,4'-bis(3-amino-5-trifluoromethyl-phenoxy)diphenyl sulfone, 2,2-bis{4-(4-amino-3-trifluoromethyl-phenoxy) phenyl}hexafluoropropane, bis{(trifluoromethyl)-amino-phenoxy}biphenyl, bis[{(trifluoromethyl)amino-phenoxy}phenyl]hexafluoro-propane and bis{2-[(amino-phenoxy)phenyl]hexafluoro-isopropyl}benzene.

Examples of the foregoing fluorine atom-free tetracarboxylic acid dianhydrides include acid anhydrides such as p-terphenyl-3,4,3",4"-tetracarboxylic acid dianhydride, pyromellitic acid dianhydride, 3,3',4,4'-benzophenone tetracarboxylic acid dianhydride, 3,3',4,4'-biphenyl-tetracarboxylic acid dianhydride, 3,3',4,4'-biphenyl ether tetra-carboxylic acid dianhydride, 1,2,5,6-naphthalene tetracarboxylic acid dianhydride, 2,3,6,7-naphthalene tetracarboxylic acid dianhydride, 2,3,5,6-pyridine tetracarboxylic acid dianhydride, 1,4,5,8-naphthalene tetracarboxylic acid dianhydride, 3,4,9,10-perylene tetracarboxylic acid dianhydride, 4,4'-sulfonyl-diphthalic acid dianhydride, 3,3',4,4'-tetraphenyl-silane tetracarboxylic acid dianhydride, meta-terphenyl-3,4,3",4"-tetracarboxylic acid dianhydride, 3,3',4,4'-diphenyl ether tetracarboxylic acid dianhydride, 1,3-bis(3,4-dicarboxy-phenyl)-1,1,3,3-tetramethyl di-siloxane dianhydride and 1-(2,3-dicarboxy-phenyl)-3-(3,4-dicarboxy-phenyl)-1,1,3,3-tetramethyl di-siloxane dianhydride. When it is intended to obtain a polyamide-imide resin, acid anhydrides such as trimellitic acid anhydride chloride are used.

Examples of the foregoing diamines free of any fluorine atom are 4,4'-diamino-diphenyl ether, 4,4'-diamino-diphenyl methane, 4,4'-diamino-diphenyl sulfone, 4,4'-di-amino-diphenyl sulfide, benzidine, m-phenylene-diamine, p-phenylene-diamine, 2,2-bis(4-aminophenoxy-phenyl)propane, 1,5-naphthalene-diamine, 2,6-naphthalene-diamine, bis-(4-aminophenoxy-phenyl)sulfone, bis-(4-aminophenoxy-phenyl)sulfide, bis-(4-aminophenoxy-phenyl)biphenyl, 1,4-bis(4-aminophenoxy)benzene, 1,3-bis(4-amino-phenoxy) benzene, 3,4'-diamino-diphenyl ether, 3,3'-dimethyl-4,4'-diamino-biphenyl, 3,3'-dimethoxy-4,4'-diamino-biphenyl, 4,4'-diamino-diphenyl ether-3-sulfon-amide, 3,4'-diamino-diphenyl ether-4-sulfonamide, 3,4'-diamino-diphenyl ether-3-sulfonamide, 3,3'-diamino-diphenyl ether-4-sulfonamide, 4,4'-diamino-diphenyl-methane-3-sulfonamide, 3,4'-di-amino-diphenyl-methane-4-sulfonamide, 3,4'-diamino-diphenyl-methane-3'-sulfonamide, 3,3'-diamino-diphenyl-methane-4-sulfonamide, 4,4'-diamino-diphenylsulfone-3-sulfonamide, 3,4'-diamino-diphenylsulfone-4-sulfonamide, 3,4'-diamino-diphenylsulfone-3'-sulfonamide, 3,3'-diamino-diphenylsulfone-4-sulfon-amide, 4,4'-diamino-diphenylsulfide-3-sulfonamide, 3,4'-diamino-diphenylsulfide-4-sulfonamide, 3,3'-diamino-diphenylsulfide-4-sulfonamide, 3,4'-diamino-diphenylsulfide-3'-sulfonamide, 1,4-diamino-benzene-2-sulfonamide, 4,4'-diamino-diphenyl ether-3-carbonamide, 3,4'-diamino-diphenyl ether-4-carbonamide, 3,4'-diamino-diphenyl ether-3'-carbonamide, 3,3'-diamino-diphenyl ether-4-carbonamide, 4,4'-diamino-diphenyl-methane-3-carbonamide, 3,4'-diamino-diphenyl-methane-4-carbonamide, 3,4'-diamino-diphenyl-methane-3'-carbonamide, 3,3'-diamino-diphenyl-methane-4-carbonamide, 4,4'-diamino-diphenyl-sulfone-3-carbonamide, 3,4'-diamino-diphenylsulfone-4-carbonamide, 3,4'-diamino-diphenylsulfone-3'-carbonamide, 3,3'-diamino-diphenylsulfone-4-carbonamide, 4,4'-diamino-diphenylsulfide-3-carbonamide, 3,4'-diamino-diphenylsulfide-4-carbonamide, 3,3'-diamino-diphenylsulfide-4-carbonamide, 3,4'-diamino-diphenylsulfide-3'-carbonamide and 1,4-diamino-benzene-2-carbonamide.

Either of the foregoing tetracarboxylic acid dianhydride or diamine may be used alone or in any combination. It is also possible to use a solution of a precursor for the polyimide type resin showing light-sensitivity.

The resulting polyimide type resin precursor solution may be applied onto the surface of a substrate according to, for instance, a method using a spinner or a printing method and then it is cured by heating to a final temperature ranging from 200 to 400° C. to thus convert into a polyimide type resin film.

The thickness of the protective layer consisting of a polymeric material having resistance to solvent attack higher than that observed for the clad layer preferably ranges from 0.5 to 10 μm. This is because if the thickness thereof is thinner than 0.5 μm, pinholes are formed on the resulting protective layer and therefore, the resulting layer cannot always serve as a protective layer.

The solution for forming a solvent-resistant protective layer may be applied onto the surface of a substrate according to, for instance, a method using a spinner or a printing method and then it is cured by heating to a final temperature of not more than 350° C. to thus convert the coated layer into a solvent-resistant protective film.

In the present invention, whether a specific polymer is superior in the solvent resistance to the clad material used or not can be evaluated by a solubilization test using acetone. More specifically, a piece of a target polymer is maintained at a temperature of 40° C., followed by dropping a drop of acetone thereon, allowing it to stand for 10 minutes and then observing the surface of the polymer, on which the acetone is dropped, by a microscope. If the polymer surface is never dissolved or it never undergoes any swelling, it is further inspected for the presence of any crack. As a result, if there is not observed any crack on the polymer surface, the polymer is judged to be excellent, while if there is observed cracks even in a minor level, it is judged not to be excellent. In this respect, if the polymer surface is solubilized or it gets swollen, the polymer is judged to be a reject article and therefore, any further inspection for the presence of any crack is omitted in this case.

In other embodiments of the present invention, each polymeric optical waveguide film provided thereon with a solvent-resistant protective layer on at least one side thereof has an elastic modulus ranging from 2 to 9 GPa. This is because, such an elastic modulus would provide a polymeric optical waveguide film having a moderate flexibility, any defect is hardly generated on the surface of the clad layer and the resulting film is not easily peeled off from the substrate during the production thereof. The elastic modulus thereof falls within the range of from 2 to 6 GPa, more preferably 2 to 5 GPa and further preferably 2.5 to 4 GPa. In this regard, if the elastic modulus of the film is too low, the flexibility thereof is increased, but the optical waveguide is deformed and this would adversely affect the transmission characteristics. On the other hand, the elastic modulus is too high, the resulting optical waveguide film becomes fragile and does not show the foregoing desired effects at all.

Materials which can impart such an elastic modulus to an optical waveguide film are, for instance, polyimide type resins. Thus, it is preferred that all of the core, clad and solvent-resistant protective layer of the optical waveguide film be formed from polyimide resins, but the core may be prepared from other materials from the viewpoint of the optical transmission loss of the resulting optical waveguide film.

In the present invention, the term "elastic modulus of a film" means the value determined according to the indentation method as will be discussed below. The indentation method is one comprising the steps of applying a load to a sample material and then removing the same, continuously using a load-applying jig (indentor) and then quantitatively evaluating characteristic properties of the material such as the hardness thereof and characteristics concerning the elastic and/or plastic deformation thereof such as elastic modulus on the basis of the resulting load-variation curve. Among the indentation methods, the present invention employs, in particular, a method which makes use of a nano-indentor capable of determining a load on the order of 1 µN to 1 mN at an indentation depth on the order of 1 nm to 1 µm. In brief, a quadrangular pyramid-like (Vickers) indentor 20 as shown in FIG. 1 is pressed in a sample material 10, followed by the determination of the indentation load (P) and the indentation depth (h) at that time and changing these values P and h till the elastic modulus reaches a constant value (or it is saturated) to thus determine the elastic modulus of the material. More specifically, the elastic modulus is determined at an indentation speed of 100 µN/sec using, for instance, an extremely low load-thin film hardness tester (available from Hysitron Inc. equipped with Triboscope system+Nanoscope-III-D3100 Model available from Digital Instruments Inc.) and an indentor (available from Berkovic) having a curvature radius of about 150 nm.

Examples of the present invention will now be described below.

EXAMPLES

Example 1

The foregoing fluorine atom-free polyimide type resin precursor solution (available from Hitachi Chemical Co., Ltd. under the trade name of PIQ13) for forming a solvent-resistant protective layer was applied, by the spin-coating technique (2000 rpm/30 minutes), onto a silicon wafer having a diameter of about 12.7 cm and a thickness of 1 mm and having an $SiO_2$ film of 2 µm thick formed on the surface thereof while the solution was dropwise added to the wafer and then the coated film was dried on a hot plate (200° C./5 minutes) to form a solvent-resistant protective layer (having a film thickness of about 4 µm). The foregoing fluorine atom-containing polyimide type resin precursor solution (available from Hitachi Chemical Co., Ltd. under the trade name of OPI-N1005) for preparing a clad layer was applied, by the spin-coating technique (1500 rpm/30 minutes), onto the resulting protective layer while the solution was dropwise added to the wafer and then cured by heating in an oven (100° C./30 minutes+200° C./30 minutes+350° C./60 minutes) to thus form a lower clad layer (having a film thickness of about 10 µm).

Subsequently, the foregoing fluorine atom-containing polyimide type resin precursor solution (available from Hitachi Chemical Co., Ltd. under the trade name of OPI-N3205) for preparing a core layer was applied, by the spin-coating technique (2000 rpm/30 minutes), onto the resulting lower clad layer while the solution was dropwise added to the wafer and then cured by heating in an oven (100° C./30 minutes+200° C./30 minutes+350° C./60 minutes) to thus form a core layer (having a film thickness of about 6.5 µm).

A silicon-containing resist layer was formed on the core layer, followed by the exposure thereof to light rays through a mask carrying a core pattern, the development of the exposed resist layer to give a desired resist pattern and the reactive ion etching of the core layer through the resulting resist pattern to thus form a core pattern. Then the resist was removed, the foregoing fluorine atom-containing polyimide type resin precursor solution (available from Hitachi Chemical Co., Ltd. under the trade name of OPI-N1005) for preparing a clad layer was applied, by the spin-coating technique (1200 rpm/30 minutes), onto the wafer in such a manner that the core pattern was completely covered with the solution while the solution was dropwise added to the wafer and then cured by heating in an oven (100° C./30 minutes+200° C./30 minutes+350° C./60 minutes) to thus form an upper clad layer (film thickness, as determined at the portion just above the core, of about 10 µm and that as determined at the other portion of about 15 µm).

Further, the foregoing fluorine atom-free polyimide type resin precursor solution (available from Hitachi Chemical Co., Ltd. under the trade name of PIQ13) for forming a solvent-resistant protective layer was applied, by the spin-coating technique (2000 rpm/30 minutes), onto the upper clad layer thus formed while the solution was dropwise added to the wafer and then the coated film was dried on a hot plate (200° C./5 minutes) to form a solvent-resistant protective layer (having a film thickness of about 4 μm).

When the resulting optical waveguide on the substrate was immersed in water (maintained at 100° C.) for 30 minutes, the optical waveguide could easily be released from the substrate and a polymeric optical waveguide film could thus be obtained, which was provided with solvent-resistant protective layers on the both sides thereof.

A drop of acetone was dropped on the surface of the resulting waveguide film, but it was found that any crack was not formed on the surface at all. On the other hand, a drop of acetone was likewise dropped on the upper clad layer of a polymeric optical waveguide film free of any solvent-resistant protective layer on the upper clad layer and it was found that cracks were formed on the surface thereof.

In addition, the elastic modulus of this film was determined using the method and the device discussed above and it was found to be 3.9 GPa. More specifically, it was determined under the following conditions: an indentation speed was set at 100 μN/sec; an extremely low load-thin film hardness tester (available from Hysitron Inc. equipped with Triboscope system+Nanoscope-III-D3100 Model available from Digital Instruments Inc.) and an indentor (available from Berkovic) having a curvature radius of about 150 nm were employed.

Example 2

The same procedures used in Example 1 were repeated except that any solvent-resistant protective layer was not formed on the upper clad layer to thus form a polymeric optical waveguide film carrying a solvent-resistant protective layer on one side thereof. It was found that the side of the film on which the solvent-resistant protective layer had been formed (or the face peeled off from the substrate) never generated any crack even when acetone was dropwise added thereto.

INDUSTRIAL APPLICABILITY

The polymeric optical waveguide film of the present invention is provided with a solvent-resistant protective layer on at least one of the surface and back face thereof and the protective layer has a moderate adhesive force with respect to the substrate. This would accordingly prevent the formation of any defect on the surface of the clad layer during the course of the production process, this makes the handling of the resulting film easy, this would prevent any release of the film from the substrate during the production thereof and the resulting film can easily be released from the substrate by immersing it in water (or hot water). In addition, any crack is not formed on the surface of the film even when a currently used solvent such as acetone is used in the step for washing the film. Each of the polymeric optical waveguide films according to other embodiments of the present invention has an elastic modulus ranging from 2 to 9 GPa and a high flexibility and it is provided with a protective layer having a moderate adhesive force with respect to the substrate. Therefore, this would prevent the formation of any defect on the surface of the clad layer during the course of the production process, this makes the handling of the resulting film easy and this would prevent any release of the film from the substrate during the production thereof.

The polymeric optical waveguide film of the present invention shows good flexibility and therefore, it can suitably be used as an optical element, which should have good flexibility, such as optical interconnections, optical multiplexers and optical branching filters (optical demultiplexers).

The invention claimed is:

1. A method for the preparation of a polymeric optical waveguide film having protective films on both sides, wherein the method comprises, in order, the steps of:
    forming a first protective layer of polymer material having resistance to solvent attack higher than that observed for a lower clad layer on a silicon substrate provided thereon with a silicon oxide film;
    forming the lower clad layer;
    forming a core layer on the lower clad layer;
    forming an upper clad layer so as to completely cover the core layer and then forming a second protective layer of polymer material having resistance to solvent attack higher than that observed for the upper clad layer on the latter, to thus form a polymeric optical waveguide film on the silicon substrate;
    and thereafter immersing the resulting assembly in water to peel the optical waveguide film off from the silicon substrate.

2. A method for the preparation of a polymeric optical waveguide film having a protective film on one side thereof, wherein the method comprises, in order, the steps of:
    forming a protective layer of polymer material having resistance to solvent attack higher than that observed for a lower clad layer on a silicon substrate provided thereon with a silicon oxide film;
    forming the lower clad layer;
    forming a core layer on the lower clad layer and forming an upper clad layer so as to completely cover the core layer to thus form a polymeric optical waveguide film on the silicon substrate;
    and thereafter immersing the resulting assembly in water to peel the optical waveguide film off from the silicon substrate.

3. The method for the preparation of a polymeric optical waveguide film as set forth in claim 1, wherein the core and clad comprise a polymer material that comprises a fluorine atom-containing polyimide type resin, and the solvent-resistant polymer material of the first and second protective layers comprises a fluorine atom-free polyimide type resin.

4. The method for the preparation of a polymeric optical waveguide film as set forth in claim 3, wherein the fluorine atom-containing polyimide type resin is a member selected from the group consisting of fluorine atom-containing polyimide resins, fluorine atom-containing poly(imide-isoindolo-quinazolin-dione-imide) resins, fluorine atom-containing poly(ether-imide) resins, fluorine atom-containing poly(amide-imide) resins and any combinations of at least two of the members of the group.

5. The method for the preparation of a polymeric optical waveguide film as set forth in claim 1, wherein an elastic modulus of the polymeric optical waveguide film ranges from 2 to 9 GPa.

6. The method for the preparation of a polymeric optical waveguide film as set forth in claim 2, wherein the core and clad comprise a polymer material that comprises a fluorine atom-containing polyimide type resin, and the solvent-resistant polymer material of the protective layer comprises fluorine atom-free polyimide type resin.

7. The method for the preparation of a polymeric optical waveguide film as set forth in claim 6, wherein the fluorine atom-containing polyimide type resin is a member selected from the group consisting of fluorine atom-containing polyimide resins, fluorine atom-containing poly(imide-isoindolo-quinazolin-dione-imide) resins, fluorine atom-containing poly(ether-imide) resins, fluorine atom-containing poly(amide-imide) resins and any combinations of at least two of the members of the group.

8. The method for the preparation of a polymeric optical waveguide film as set forth in claim 2, wherein an elastic modulus of the polymeric optical waveguide film ranges from 2 to 9 GPa.

9. The method for the preparation of a polymeric optical waveguide film as set forth in claim 6, wherein an elastic modulus of the polymeric optical waveguide film ranges from 2 to 9 GPa.

10. The method for the preparation of a polymeric optical waveguide film as set forth in claim 3, wherein an elastic modulus of the polymeric optical waveguide film ranges from 2 to 9 GPa.

11. The method for the preparation of a polymeric optical waveguide film as set forth in claim 4, wherein an elastic modulus of the polymeric optical waveguide film ranges from 2 to 9 GPa.

12. A method for the preparation of a polymeric optical waveguide film whose core and clad are constituted from polymer materials, the film comprising a protective layer of polymer material having resistance to solvent attack higher than that observed for the clad, wherein the protective layer is arranged on at least one of the surface and back face of the waveguide film, wherein the method of preparation comprises, in order, the steps of:

(a) forming the protective layer of polymer material having resistance to solvent attack higher than that observed for a lower clad layer on a silicon substrate provided thereon with a silicon oxide film;

(b) forming the lower clad layer;

(c) forming a core layer on the lower clad layer and forming an upper clad layer so as to completely cover the core layer to form a polymeric optical waveguide film on the silicon substrate, thereby forming an assembly; and (d) thereafter immersing the resulting assembly in water to peel the optical waveguide film off from the silicon substrate.

* * * * *